US012760837B2

(12) United States Patent
Li

(10) Patent No.: US 12,760,837 B2
(45) Date of Patent: Oct. 13, 2026

(54) SCREEN SPLITTER WITH RETRACTABLE BRACKET STRUCTURE

(71) Applicant: Zhang Li, Shenzhen (CN)

(72) Inventor: Zhang Li, Shenzhen (CN)

( * ) Notice: Subject to any disclaimer, the term of this patent is extended or adjusted under 35 U.S.C. 154(b) by 40 days.

(21) Appl. No.: 19/021,075

(22) Filed: Jan. 14, 2025

(65) Prior Publication Data

US 2026/0160381 A1 Jun. 11, 2026

(30) Foreign Application Priority Data

Dec. 11, 2024 (CN) ......................... 202411822030.0

(51) Int. Cl.
*F16M 13/02* (2006.01)
*F16M 11/10* (2006.01)

(52) U.S. Cl.
CPC .......... *F16M 13/022* (2013.01); *F16M 11/10* (2013.01)

(58) Field of Classification Search
CPC ..... A47B 23/042; A47B 23/043; A47B 97/08; F16M 11/10; F16M 13/022; F16M 13/00
USPC ....... 248/454, 455, 456, 463, 469, 472, 460, 248/444.1, 447, 448, 371, 398, 157, 421, 248/423, 274.1, 286.1, 354.1, 354.3, 248/354.4
See application file for complete search history.

(56) References Cited

U.S. PATENT DOCUMENTS 1,959,746 A * 5/1934 Stout ...................... A47G 1/143 248/455
2,007,535 A * 7/1935 Kapnek .................. A47G 1/143 248/455
3,343,777 A * 9/1967 Becker ................... A47G 1/143 248/455
5,927,673 A * 7/1999 Kurokawa ............ G06F 1/1626 248/456
7,301,759 B2 * 11/2007 Hsiung ................ H05K 5/0234 248/676
7,744,055 B2 * 6/2010 Zeng .................... F16M 13/005 248/447
7,758,009 B1 * 7/2010 Chang .................. A47B 23/044 248/456
7,984,883 B2 * 7/2011 Li ...................... H04N 1/00127 396/419
8,820,525 B1 * 9/2014 Zanxiang ............... F16M 11/10 206/45.24
8,950,725 B2 * 2/2015 Huang ................. F16M 13/022 248/921
9,316,344 B2 * 4/2016 Le Gette ................ F16M 13/02

(Continued)

*Primary Examiner* — Terrell L Mckinnon
*Assistant Examiner* — Michael McDuffie

(57) ABSTRACT

A screen splitter with a retractable bracket structure, including a back panel and a display screen, wherein a first groove is formed on a left side of the front of the back panel, a slide plate is provided in the first groove, a second groove is formed in the slide plate, and a connecting component is movably provided in the second groove and is connected to the display screen; first stoppers are provided on a left side of the first groove, and the connecting component is provided with second stoppers corresponding to the first stoppers; a bracket is provided on a right side of the back of the back panel. Technical effects: good stability is ensured in one-level height adjustment and the opening and locking operations are simple for two-level height adjustment. The supporting structure is used as a bracket and also as a screen protector when retracted for storage.

17 Claims, 6 Drawing Sheets

(56) References Cited

U.S. PATENT DOCUMENTS

| | | | | |
|---|---|---|---|---|
| 10,760,728 | B1 * | 9/2020 | Maalouf | G06F 3/03547 |
| 11,712,115 | B2 * | 8/2023 | Cheney | A47B 97/00 248/70 |
| 2005/0109893 | A1 * | 5/2005 | Chueh | F16M 11/10 248/133 |
| 2010/0001163 | A1 * | 1/2010 | Takizawa | G06F 1/1626 248/371 |
| 2012/0236475 | A1 * | 9/2012 | Peng | F16M 11/2021 361/679.01 |
| 2012/0275094 | A1 * | 11/2012 | Zhou | F16M 11/10 361/679.01 |
| 2016/0106190 | A1 * | 4/2016 | Song | F16M 11/2021 248/447 |
| 2023/0184370 | A1 * | 6/2023 | Kang | F16M 11/22 248/121 |

* cited by examiner

SCREEN SPLITTER WITH RETRACTABLE BRACKET STRUCTURE

CROSS-REFERENCE TO RELATED APPLICATIONS

This application claims priority benefits to Chinese Patent Application No. 202411822030.0, filed on Dec. 11, 2024, the contents of which are incorporated herein by reference.

BACKGROUND OF THE INVENTION

Technical Field

The present invention relates to the technical field of screen splitters with a retractable bracket structure and, in particular, to a screen splitter with a retractable bracket structure.

Description of Related Art

There are two solutions for existing single-screen splitter brackets. One is a product housing coming with a support rod for support, and the other is direct use of an external bracket to fix a screen.

In the above two structural solutions, the first one has the disadvantages of limited display angle, easy fatigue, inability to freely choose a comfortable angle, and poor experience in actual application. The second structural solution which uses an external bracket has the disadvantage of limited viewing angle; in addition, since the external bracket can only be placed on the left and right sides of a computer and cannot realize display above the computer, the solution also has the disadvantages of poor experience, inconvenient carrying, poor product neatness and the like.

BRIEF SUMMARY OF THE INVENTION

The present invention provides a screen splitter with a retractable bracket structure and solves the problems of the existing modes.

In order to achieve the above objective, the present invention provides the following technical solutions:

A screen splitter with a retractable bracket structure, including a back panel 100 and a display screen 200, wherein a first groove 101 is formed on a left side of the front of the back panel 100, a slide plate 102 is provided in the first groove 101, a second groove 103 is formed in the slide plate 102, and a connecting component 104 is movably provided in the second groove 103 and is connected to the display screen 200; first stoppers 105 are provided on a left side of the first groove 101, and the connecting component 104 is provided with second stoppers 106 corresponding to the first stoppers 105; a bracket 107 is provided on a right side of the back of the back panel 100.

Preferably, a first clamping portion 108 extending backward is provided on a left side of the slide plate 102, a second clamping portion 109 extending backward is provided on a right side of the bracket 107, and the first clamping portion 108 works together with the second clamping portion 109 to clamp the display screen 200.

Preferably, third stoppers 110 are provided on sides of the first groove 101.

Preferably, a fourth groove 111 is formed on a side of the first groove 101; each third stopper 110 includes an elastic component 112 and a damping component 113, one end of the elastic component 112 is connected to the bottom of the fourth groove 111, the other end of the elastic component 112 is connected to the damping component 113, and the other end of the damping component 113 abuts against the side of the slide plate 102.

Preferably, a clockwork mechanism 114 is provided in the second groove 103 and is connected to the connecting component 104.

Preferably, fourth stoppers 115 are provided at two ends of the back of the slide plate 102.

Preferably, a fifth groove 116 is provided on the right side of the back of the back panel 100, and the bracket 107 is provided in the fifth groove 116.

Preferably, the connecting component 104 includes a rotatable suction cup 117, and the back of the display screen 200 is provided with a sixth groove 201 corresponding to the rotatable suction cup 117.

Preferably, a 75 mm mounting hole 202 is provided at the back of the display screen 200.

Preferably, a TYPE-C interface and a MINI HDMI interface are provided at the back of the display screen 200.

By implementing the above technical solution, the following technical effects are achieved: good stability is ensured in one-level height adjustment and the opening and locking operations are simple for two-level height adjustment. The supporting structure can be used as a bracket and also as a screen protector when retracted for storage. The screen splitter supports 360-degree rotation and can be adjusted freely at multiple angles. The pull-out rod slide plate supports two-level adjustment to adapt to computers of different sizes. The suction cup and the bracket are combined by a clockwork structure, and the elastic force of the clockwork structure is equal to the gravity of the screen. The present invention ensures smooth pulling and the stability of the bracket and improves installation convenience, use convenience and practicality.

DETAILED DESCRIPTION OF THE INVENTION

In order to better understand the technical solution of the invention, the embodiments of the invention are described in detail below with reference to the accompanying drawings.

Figure 1:
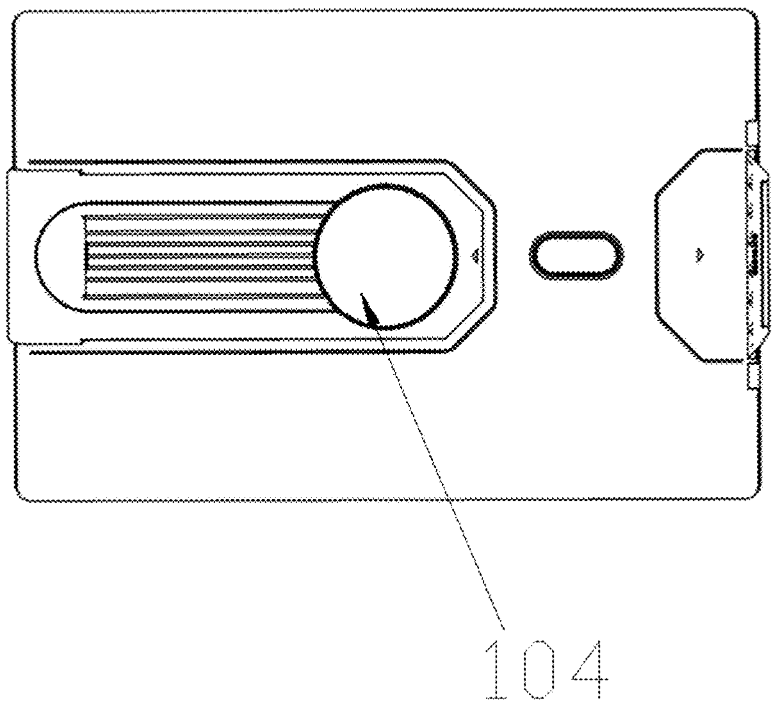
FIG. 1 is an overall schematic structural diagram (front view) of a screen splitter with a retractable bracket structure according to the present invention in a retracted state.
Figure 2:
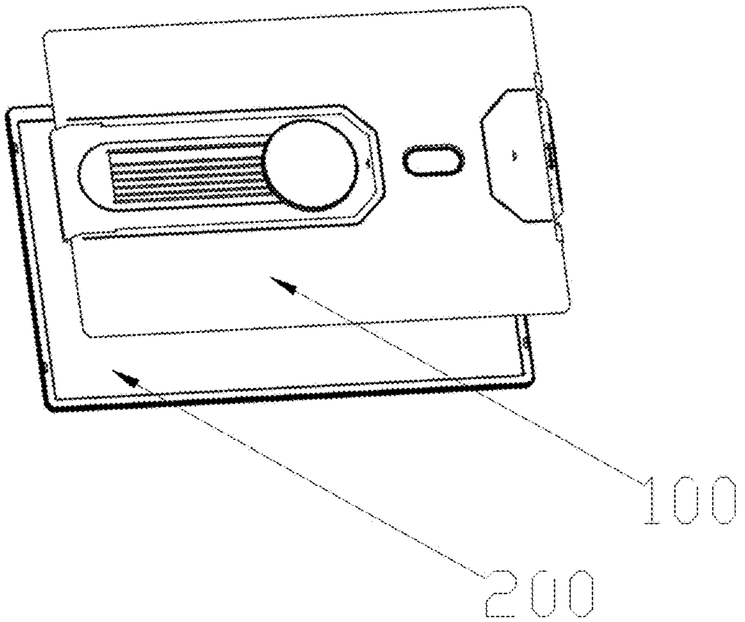
FIG. 2 is an overall schematic structural diagram (stereoscopic diagram) of a screen splitter with a retractable bracket structure according to the present invention.
Figure 3:
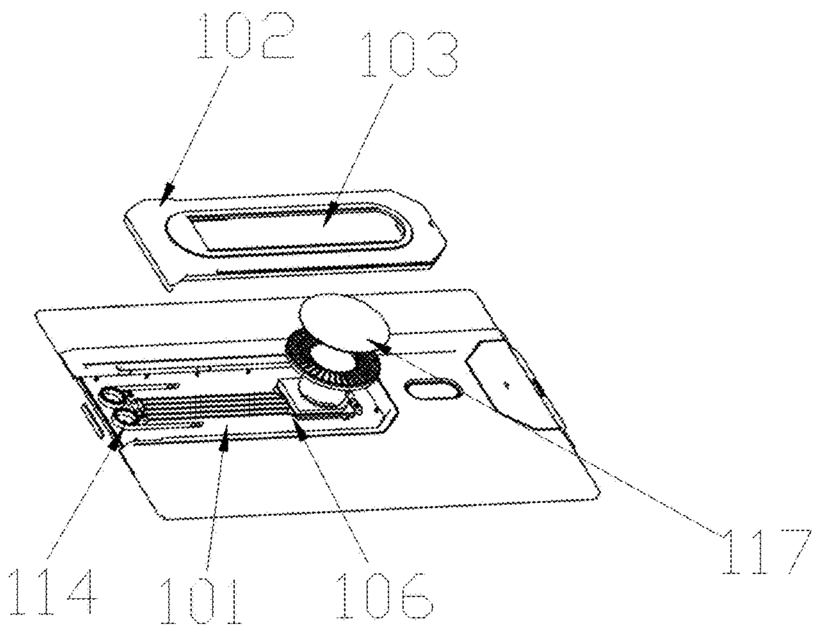
FIG. 3 is a partial structural diagram (sectional view) of a screen splitter with a retractable bracket structure according to the present invention.
Figure 4:
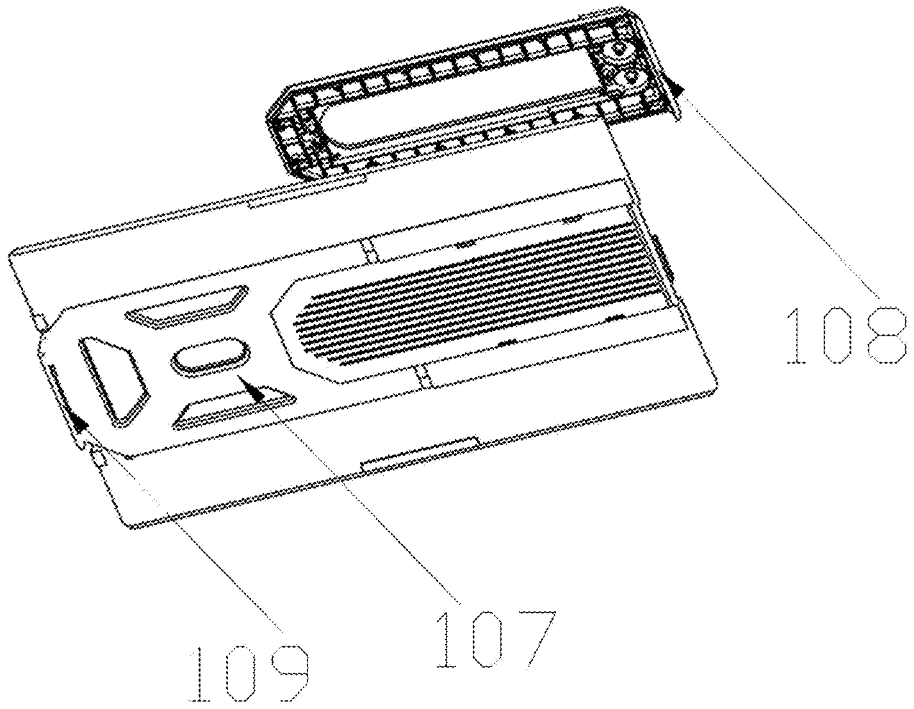
FIG. 4 is a partial structural diagram (sectional view) of a screen splitter with a retractable bracket structure according to the present invention.
Figure 5:
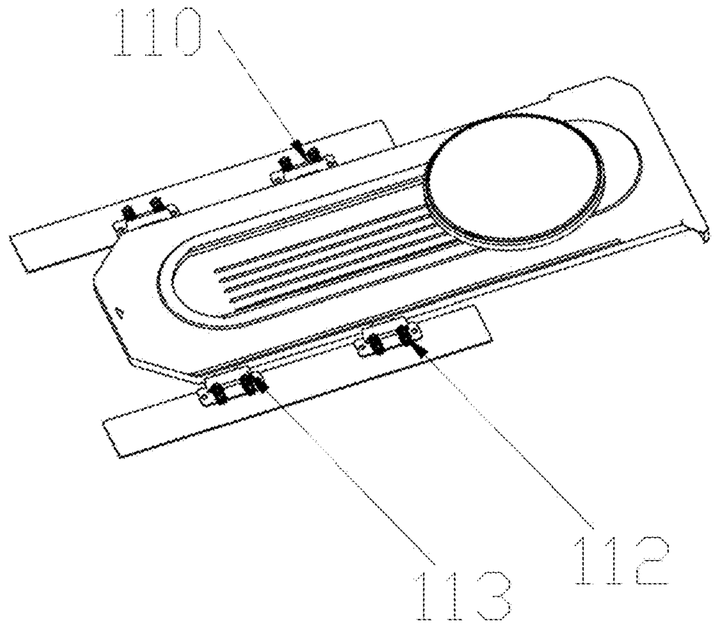
FIG. 5 is a partial structural diagram (sectional view) of a screen splitter with a retractable bracket structure according to the present invention.
Figure 6:
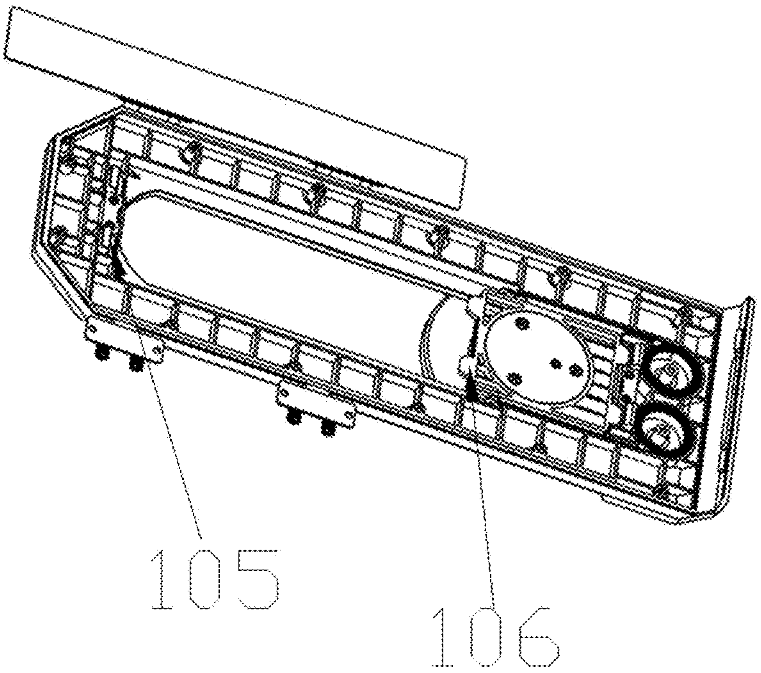
FIG. 6 is a partial structural diagram (sectional view) of a screen splitter with a retractable bracket structure according to the present invention.
Figure 7:
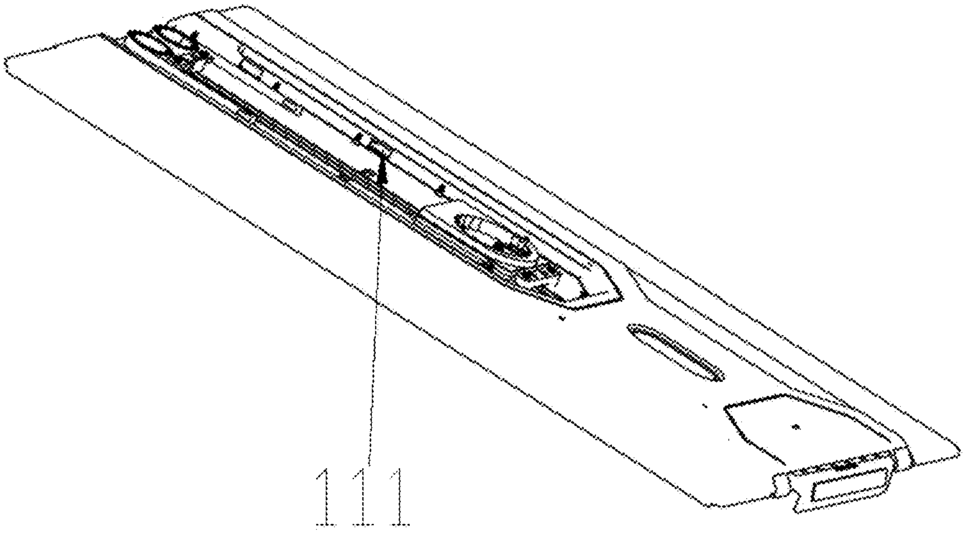
FIG. 7 is a partial structural diagram (sectional view) of a screen splitter with a retractable bracket structure according to the present invention.
Figure 8:
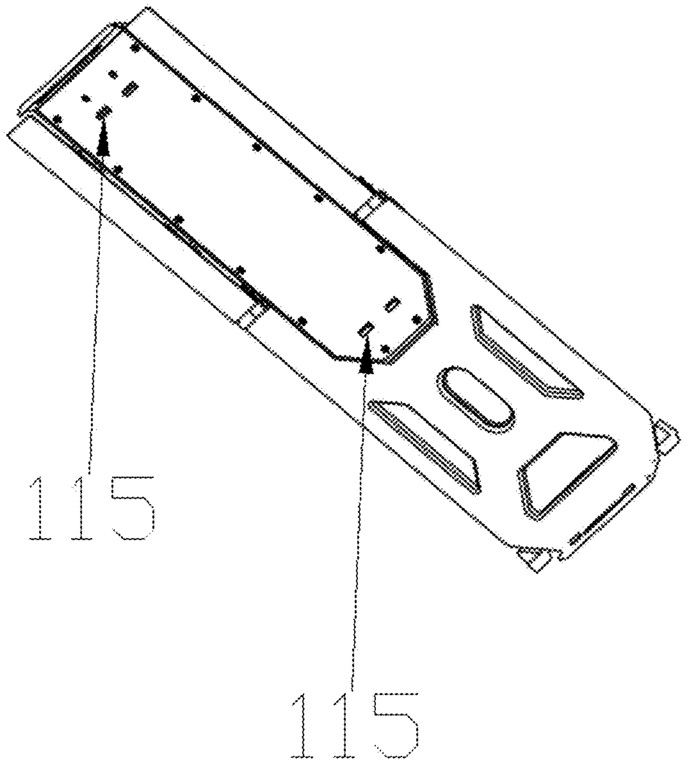
FIG. 8 is a partial structural diagram (sectional view) of a screen splitter with a retractable bracket structure according to the present invention.
Figure 9:
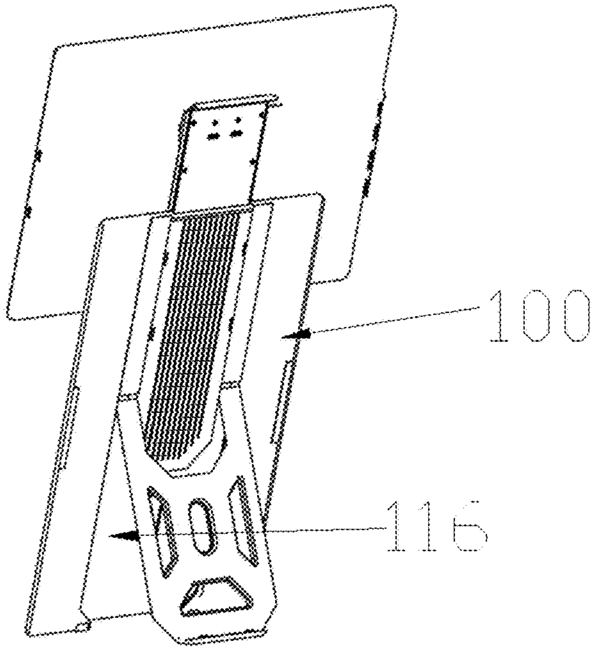
FIG. 9 is an overall schematic structural diagram (stereoscopic diagram) of a screen splitter with a retractable bracket structure according to the present invention in a use state.
Figure 10:
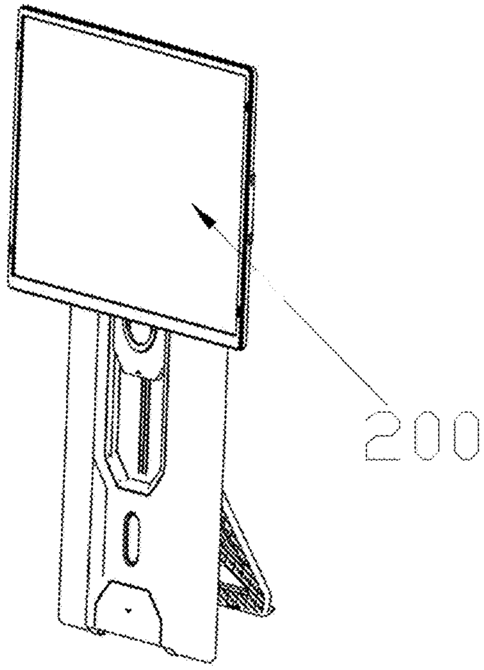
FIG. 10 is an overall schematic structural diagram (stereoscopic diagram) of a screen splitter with a retractable bracket structure according to the present invention in a use state.
Figure 11:
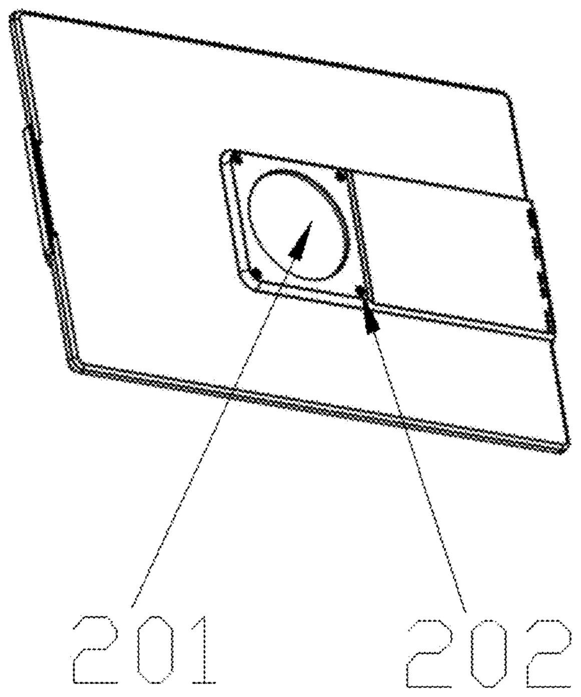
FIG. 11 is an overall schematic structural diagram (stereoscopic diagram) of a screen splitter with a retractable bracket structure according to the present invention in a retracted state.

As shown in FIGS. 1-11, it should be understood that this embodiment provides a screen splitter with a retractable bracket structure, including a back panel 100 and a display screen 200, wherein a first groove 101 is formed on a left side of the front of the back panel 100, a slide plate 102 is provided in the first groove 101, a second groove 103 is formed in the slide plate 102, and a connecting component 104 is movably provided in the second groove 103 and is connected to the display screen 200; first stoppers 105 are provided on a left side of the first groove 101, and the connecting component 104 is provided with second stoppers 106 corresponding to the first stoppers 105; a bracket 107 is provided on a right side of the back of the back panel 100.

In this embodiment, when the display screen 200 is connected to the connecting component 104, the function of preliminarily adjusting the height of the display screen 200 is achieved by changing the position of the connecting component 104 in the second groove 103. The first stoppers 105 may be elastic clips or any other structure that can movably lock the slide plate 102. When the height change caused by the movement of the connecting component 104 in the second groove 103 meets the use requirements, the first stoppers 105 limit the movement of the slide plate 102. When the connecting component 104 is pulled to the leftmost side of the second groove 103, the back panel 100 is rotated to the right. That is, when the connecting component 104 is pulled to the uppermost position of the second groove 103 and still cannot meet the height requirement, the connecting component 104 is pulled to the leftmost side of the second groove 103 and in this case, the second stoppers 106 abut against the first stoppers 105 and releases the slide plate 102 from the first stoppers 105. In this way, the function of adjusting the height of the display screen 200 at the second level can be achieved by changing the position of the slide plate 102 in the first groove 101, thereby ensuring the stability of the secondary adjustment structure when the primary adjustment structure is used to adjust the height, preventing accidental touch, and facilitating the use of the secondary adjustment structure.

In Embodiment 2, a first clamping portion 108 extending backward is provided on a left side of the slide plate 102, a second clamping portion 109 extending backward is provided on a right side of the bracket 107, and the first clamping portion 108 works together with the second clamping portion 109 to clamp the display screen 200. When the product of the present invention is not in use, the product can be retracted for storage without the help of other single parts. Moreover, the display screen is folded inwards to protect the display screen. The first clamping portion 108 and the second clamping portion 109 work together to clamp screens of different sizes in an extendable manner.

Based on the embodiments described above, further, third stoppers 110 are provided on sides of the first groove 101. The third stoppers 110 are configured to limit the movement of the slide plate 102, thereby ultimately limiting the movement of the display screen 200 connected to the slide plate 102 and improving the stability of the product in use.

Based on the embodiments described above, further, a fourth groove 111 is formed on a side of the first groove 101; each third stopper 110 includes an elastic component 112 and a damping component 113, one end of the elastic component 112 is connected to the bottom of the fourth groove 111, the other end of the elastic component 112 is connected to one end of the damping component 113, and the other end of the damping component 113 abuts against the side of the slide plate 102. When the product is in use, the third stoppers 110 provide damping to the slide plate 102 by squeezing the sides of the slide plate 102, thereby improving the stability of the slide plate 102 when the slide plate 102 is fixed. So when the display screen 200 is connected to the connecting component 104, the display screen can stably hover at any position in the second groove 103, thereby improving the stability of the product in use and providing a better user experience. In addition, when the slide plate 102 is pulled further, the damping components 113 can be used to stop the slide plate 102, so that the display screen 200 can stably hover in the second groove 103 when the display screen 200 is connected to the connecting component 104, thereby further improving the stability of the product in use. The third stoppers 110 may be present in pairs (preferably two pairs) as needed, so as to achieve two-level adjustment.

Based on the embodiments described above, further, a clockwork mechanism 114 is provided in the second groove 103 and is connected to the connecting component 104. When the display screen 200 is connected to the connecting component 104, the function of adjusting the height of the display screen 200 is achieved by changing the position of the connecting component 104 in the second groove 103. The clockwork mechanism 114 provides force to the connecting component 104 so that the display screen 200 can hover at any position in the second groove 103 when the display screen 200 is connected to the connecting component 104, thereby improving the stability of the product in use and providing a better user experience.

Based on the embodiments described above, further, fourth stoppers 115 are provided at two ends of the back of the slide plate 102. When the slide plate 102 is retracted for storage, the fourth stoppers 115 on the right side prevent over-retracting, thereby avoiding unnecessary wear during a retracting process and improving the durability of the product. When the slide plate 102 is extended to use the screen splitter at a higher height, the fourth stoppers 115 on the left side prevent over-extending, thereby avoiding unbalanced rollover of the product and improving the stability of the product in use.

Based on the embodiments described above, further, a fifth groove 116 is provided on the right side of the back of the back panel 100, and the bracket 107 is provided in the fifth groove 116. In this way, the back of the back panel 100 is a plane as a whole, thereby facilitating a tighter connection between the back panel 100 and the display screen 200 and realizing a smaller size and a more stable structure after the product is retracted for storage.

Based on the embodiments described above, further, the connecting component 104 includes a rotatable suction cup 117, and the back of the display screen 200 is provided with a sixth groove 201 corresponding to the rotatable suction cup 117. The sixth groove 201 has a structure mating the rotatable suction cup 117 but is opposite to the rotatable suction cup 117 in magnetism, so that the rotatable suction cup 117 and the sixth groove 201 can be flexibly connected, thereby realizing the flexible connection between the back panel 100 and the display screen 200 and easy use.

Based on the embodiments described above, further, a 75 mm mounting hole 202 is provided at the back of the display screen 200. The model of the mounting hole is the one with a high probability of use. This arrangement brings convenience for adapting to other brackets and for use in different scenarios.

Based on the embodiments described above, further, a TYPE-C interface and a MINI HDMI interface are provided at the back of the display screen 200, thereby being suitable for different usage scenarios and improving the user experience.

The above is a detailed description of the screen splitter with a retractable bracket structure in the embodiments of the present invention. For those skilled in the art, according to the idea of the embodiments of the invention, there will be changes in the specific implementation method and application scope. In summary, the content of this specification should not be understood as a limitation on the invention.

What is claimed is:

1. A screen splitter with a retractable bracket structure, characterized by, comprising a back panel (100) and a display screen (200), wherein a first groove (101) is formed on a left side of the front of the back panel (100), a slide plate (102) is provided in the first groove (101), a second groove (103) is formed in the slide plate (102), and a connecting component (104) is movably provided in the second groove (103) and is connected to the display screen (200);

first stoppers (105) are provided on a left side of the first groove (101), and the connecting component (104) is provided with second stoppers (106) corresponding to the first stoppers (105);

a bracket (107) is provided on a right side of the back of the back panel (100);

wherein a first clamping portion (108) extending backward is provided on a left side of the slide plate (102), a second clamping portion (109) extending backward is provided on a right side of the bracket (107), and the first clamping portion (108) works together with the second clamping portion (109) to clamp the display screen (200).

2. The screen splitter with a retractable bracket structure according to claim 1, characterized in that, third stoppers (110) are provided on sides of the first groove (101).

3. The screen splitter with a retractable bracket structure according to claim 1, characterized in that, a fourth groove (111) is formed on a side of the first groove (101); each third stopper (110) comprises an elastic component (112) and a damping component (113), one end of the elastic component (112) is connected to the bottom of the fourth groove (111), the other end of the elastic component (112) is connected to the damping component (113), and the other end of the damping component (113) abuts against the side of the slide plate (102).

4. The screen splitter with a retractable bracket structure according to claim 1, characterized in that, a clockwork mechanism (114) is provided in the second groove (103) and is connected to the connecting component (104).

5. The screen splitter with a retractable bracket structure according to claim 1, characterized in that, fourth stoppers (115) are provided at two ends of the back of the slide plate (102).

6. The screen splitter with a retractable bracket structure according to claim 1, characterized in that, a fifth groove (116) is provided on the right side of the back of the back panel (100), and the bracket (107) is provided in the fifth groove (116).

7. The screen splitter with a retractable bracket structure according to claim 1, characterized in that, the connecting component (104) comprises a rotatable suction cup (117), and the back of the display screen (200) is provided with a sixth groove (201) corresponding to the rotatable suction cup (117).

8. The screen splitter with a retractable bracket structure according to claim 1, characterized in that, a 75 mm mounting hole (202) is provided at the back of the display screen (200).

9. The screen splitter with a retractable bracket structure according to claim 1, characterized in that, a TYPE-C interface and a MINI HDMI interface are provided at the back of the display screen 200.

10. A screen splitter with a retractable bracket structure, characterized by, comprising a back panel (100) and a display screen (200), wherein a first groove (101) is formed on a left side of the front of the back panel (100), a slide plate (102) is provided in the first groove (101), a second groove (103) is formed in the slide plate (102), and a connecting component (104) is movably provided in the second groove (103) and is connected to the display screen (200);

first stoppers (105) are provided on a left side of the first groove (101), and the connecting component (104) is provided with second stoppers (106) corresponding to the first stoppers (105);

a bracket (107) is provided on a right side of the back of the back panel (100);

wherein a fourth groove (111) is formed on a side of the first groove (101); each third stopper (110) comprises an elastic component (112) and a damping component (113), one end of the elastic component (112) is connected to the bottom of the fourth groove (111), the other end of the elastic component (112) is connected to the damping component (113), and the other end of the damping component (113) abuts against the side of the slide plate (102).

11. The screen splitter with a retractable bracket structure according to claim 10, characterized in that, third stoppers (110) are provided on sides of the first groove (101).

12. The screen splitter with a retractable bracket structure according to claim 10, characterized in that, a clockwork mechanism (114) is provided in the second groove (103) and is connected to the connecting component (104).

13. The screen splitter with a retractable bracket structure according to claim 10, characterized in that, fourth stoppers (115) are provided at two ends of the back of the slide plate (102).

14. The screen splitter with a retractable bracket structure according to claim 10, characterized in that, a fifth groove (116) is provided on the right side of the back of the back panel (100), and the bracket (107) is provided in the fifth groove (116).

15. The screen splitter with a retractable bracket structure according to claim 10, characterized in that, the connecting component (104) comprises a rotatable suction cup (117), and the back of the display screen (200) is provided with a sixth groove (201) corresponding to the rotatable suction cup (117).

16. The screen splitter with a retractable bracket structure according to claim 10, characterized in that, a 75 mm mounting hole (202) is provided at the back of the display screen (200).

17. The screen splitter with a retractable bracket structure according to claim 10, characterized in that, a TYPE-C interface and a MINI HDMI interface are provided at the back of the display screen 200.

* * * * *